Patented June 17, 1924.

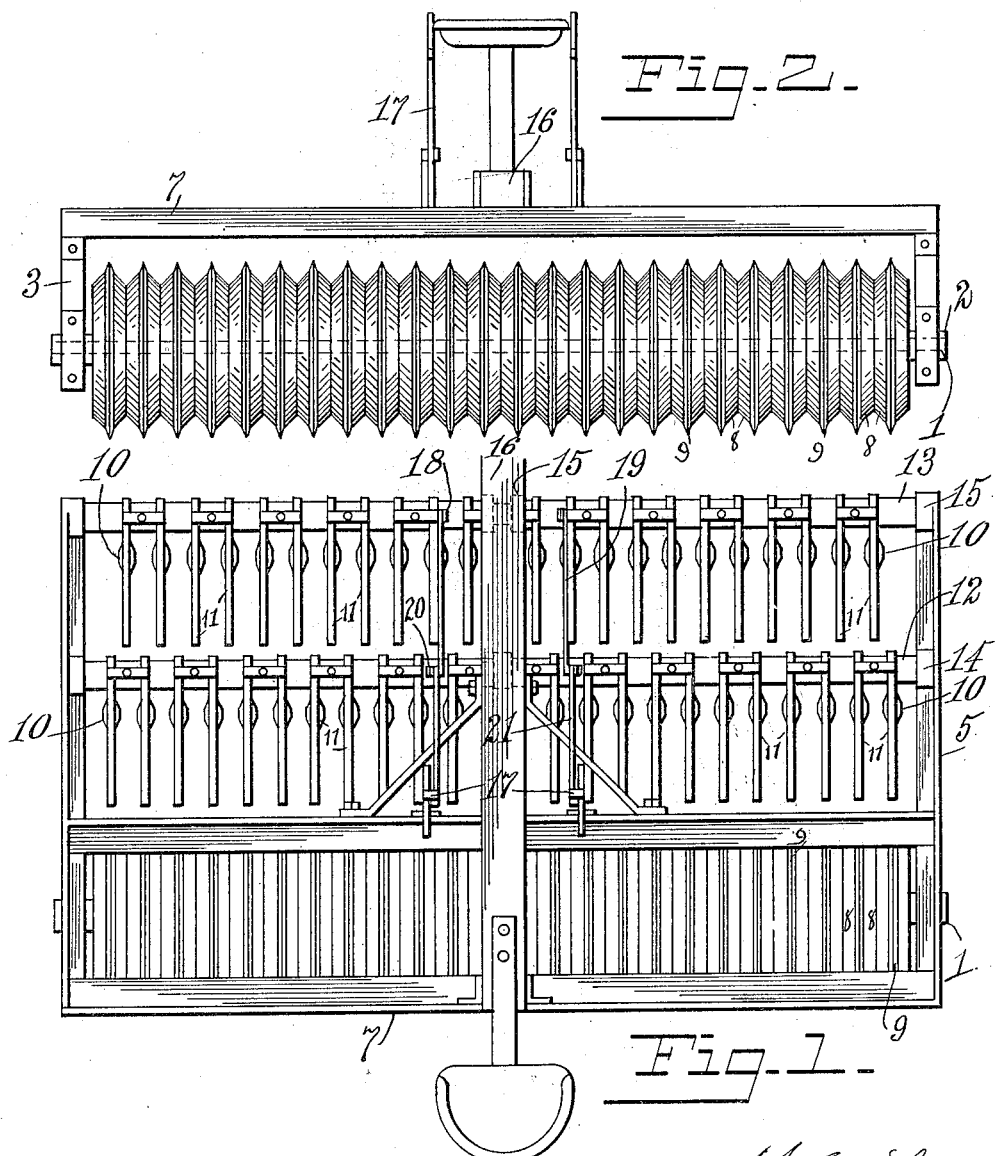

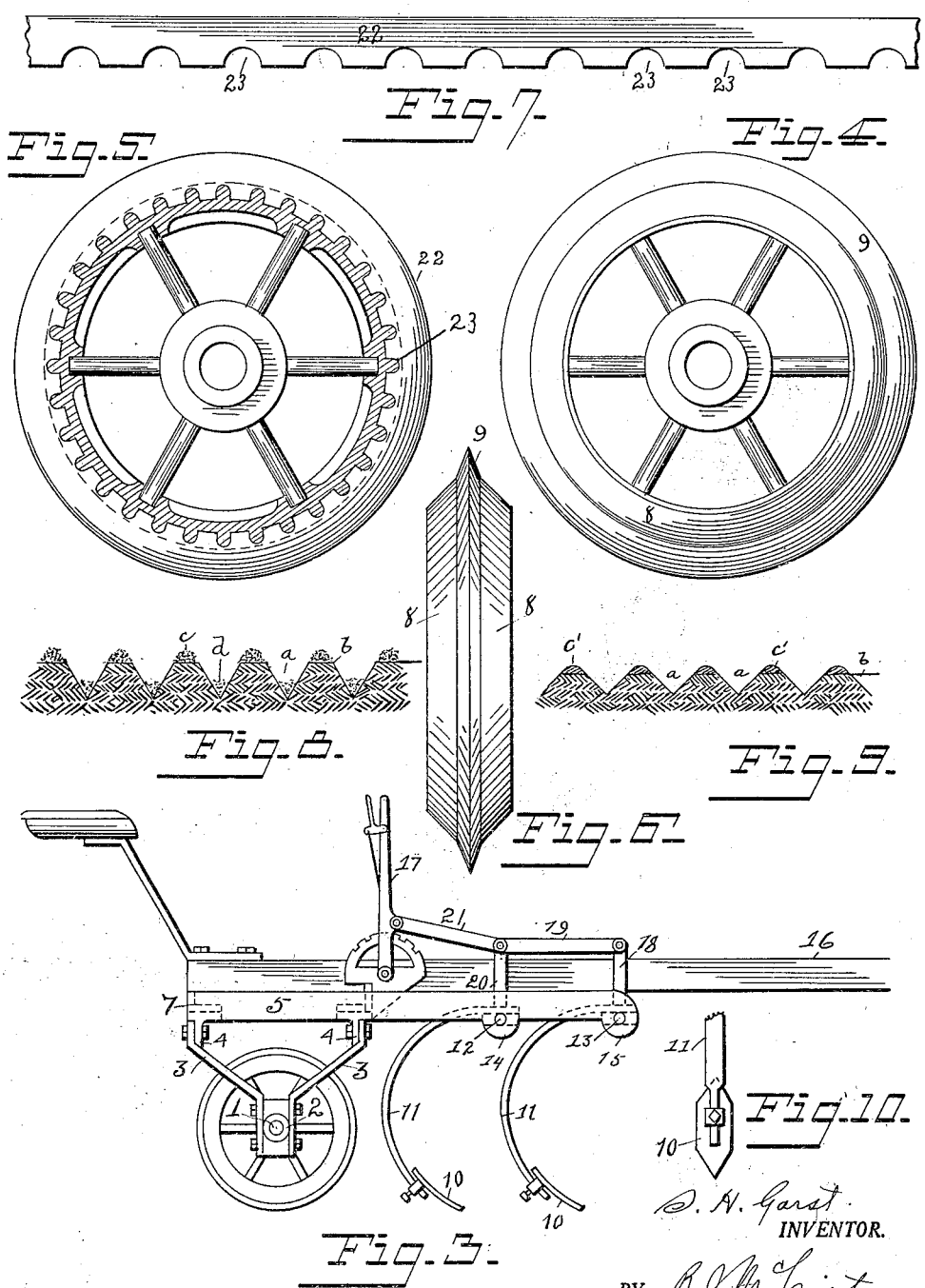

1,497,779

UNITED STATES PATENT OFFICE.

STEPHEN H. GARST, OF MOLINE, ILLINOIS.

SOIL CULTIVATOR.

Application filed December 23, 1918. Serial No. 268,007.

*To all whom it may concern:*

Be it known that STEPHEN H. GARST, a citizen of the United States, residing at Moline, in the county of Rock Island and State of Illinois, has invented certain new and useful Improvements in Soil Cultivators, of which the following is a specification.

This invention relates to improvements in soil surface pulverizers and cultivators and consists of a form of cultivator which in passing over the surface of the soil produces furrows and ridges between the furrows which are substantially uniform throughout, that is to say, the furrows are uniform in depth and the ridges between them are uniform in height and are formed throughout of well tilled soil. The soil that is moved out of the furrows is thrown up on the spaces between the furrows so that the surfaces of the soil between the furrows or the top of the ridges will be higher than before the machine passed over the ground. The piling up of the loose soil from the furrows on top of the spaces or ridges between, in addition to making the ridges higher than the surrounding surface of the ground, has a further advantage of providing a deeper furrow so that more surface of the soil is exposed to the sunshine, air and the gases present in the air. These higher ridges and relatively deep furrows prepare the surface of the soil in the best possible condition for the subsequent seed bed operation. The machine to be described, in its operation cultivates the soil and at the same time pulverizes it, and thereby performs two operations at one and the same time. Heretofore there have been provided machines for making furrows and intervening ridges but such machines, owing to their form and construction have not had a capacity for producing uniformity in the ridges or uniformity in the depth of the furrows and moreover they depend wholly upon the weight of the machine to cause the penetration of the pulverizer wheels into the ground in making the furrows. It will at once be seen that uniformity in furrows and uniformity in the formation of ridges is impossible of obtainment owing to variations in the soil. Prior machines such as referred to have been made with one or two gangs of pulverizer wheels, one gang arranged in front of the other, these wheels being depended upon alone to make the furrows and the ridges through the weight of the machine. In instances where the ground is uneven or is higher in one place than in another, and also in instances where the soil is more or less mellow or soft, the furrows will more or less vary in depth and the ridges will likewise not be uniform, a condition due to the aforesaid characteristics of the ground and to the fact that penetration of the pulverizer wheels is due entirely to the weight of the machine. It is furthermore an old practice to employ machines in which shovels are arranged in front of ground rollers, the latter in some instances being provided with ribs or flanges designed to run in openings made in the surface of the ground by the shovels for the purpose of making irrigating ditches or canals, etc. In such cases the surface of the ground is lower than it was before the machine passes over it, which condition is due to the wheels being widely spaced apart as well as the shovels. Neither of the beforementioned means are capable of producing the results obtained by the use of the present invention, the object of which is to provide a soil pulverizer or cultivator with a capacity for creating uniform furrows and uniform ridges of well tilled soil as hereinbefore indicated. In obtaining such results a special form of pulverizer wheel is employed as well as a special form of shovel, both being narrow and set closely together in gangs, the points of the shovels traveling in alignment with the peripheral centers of the wheels, as will hereinafter fully appear from the more particular description to follow in connection with the accompanying drawings.

Referring to said drawings in general terms, Fig. 1 is a top plan view of the machine; Fig. 2 is a rear elevation thereof; Fig. 3 is a side elevation; Fig. 4 is a side elevation of one of the pulverizer wheels somewhat enlarged; Fig. 5 is a similar view of one of the pulverizer wheels modified in construction as compared with Fig. 4 and partly in section; Fig. 6 is an edge view of one of said pulverizer wheels; Fig. 7 is a detail view of the blank from which is formed the center rib of the pulverizer wheel as shown in Fig. 5; Fig. 8 illustrates in transverse section the appearance, approximately, of the soil after being acted upon by the shovels in advance of the wheels; Fig. 9 is a similar view representing the soil, approximately as it appears after the wheels have moved through the furrows formed by the shovels and the cultivation is completed;

and Fig. 10 is a detail view of one of the furrow shovels and a part of its resilient supporting arm.

In a detail description of the various features of the invention similar reference characters indicate corresponding parts. The pulverizer wheels as before indicated are arranged in a gang across the machine on a shaft 1 mounted in suitable bearings 2 which are supported in depending side frame members 3 which in turn are united to brackets 4 which are rigidly secured to side members 5 of the pulverizer frame. This frame consists of the side bars 5 and cross bar 7. It is well known that the pulverizing of soil and its preparation for seeding is difficult to be accomplished effectively without much labor. In some cases it is so hard that the penetration thereof by means of the pulverizer wheels is greatly resisted and the weight of the machine as a whole is depended upon as before intimated. In order to overcome such resistance of the soil and to avoid the necessity of depending on the weight of the machine I provide an attachment which is arranged in front of the gang of pulverizer wheels and the purpose of which is to form the furrows in advance of the pulverizer wheels suitable for the subsequent action of said wheels and not to depend upon the wheels to perform this work. Referring more particularly to the construction and formation of the pulverizer wheels reference is made to Fig. 6 where 8 designates the two tapered peripheral sides of the wheel and 9 a continuous intervening sharp rib which extends unbroken throughout the circumference of the wheel and forms the highest penetrating point of its periphery. The central rib —9— has a marked tendency to wear thinner through a wearing off of the sides, this results in making the penetrating rib sharper as wear proceeds and the efficiency of the pulverizer wheels is enhanced and their penetrating power is not diminished by use. In cross section the outer side of the rim of the wheel has a V-shaped face with the edge rib 9 extending beyond and dividing the two tapered sides. The wheel as shown in Fig. 6 may be made of cast iron with the central rib 9 of steel cast integral with the rim. The wheels are narrow and lie close together so that the required number may be employed in a gang. Following in the furrows they compress the sides and bottoms of the furrows and the furrows are thus left in a smooth condition with the clods or lumps of earth pulverized. The edge ribs 9 provide a continuous surface which engages the furrow at the center and insures uniform action of the gang of wheels throughout their travel through the furrows. They act to effectively split any clods lying in the paths thereof and by extending into the firm soil the ribs prevent any slipping or sliding of the wheels. The furrows are prepared for this action of the wheels by one or two gangs of shovels which are mounted in the front of the wheels depending upon the condition of the soil. As shown in Fig. 10 the shovels 10 are pointed and each is adjustably mounted on a resilient supporting arm 11. In soil that is not over hard or packed a single gang of shovels in front of the gang of pulverizer wheels is sufficient. The shovels of this gang are mounted so that the pointed edges thereof travel in alignment with the edged ribs 9 of the pulverizer wheels, and the furrows made thereby through which the wheels travel in contact with the sides and bottoms are uniform throughout. The action of the shovels or spring teeth as they might be called, is to level the hummocks and fill up the holes and throw the soil onto the spaces between the furrows. For example, the shovels move out of the furrows sidewise enough soil to fill the flat or more or less uneven spaces between the furrows and thus furnish a sufficient amount of soil to form a ridge where the ground otherwise would be a low flat and uneven surface that was not cultivated. The gang of narrow shovels and the relatively narrow wheels aligned therewith are placed closely together and perform the work of cultivating the soil and pulverizing it. The soil which is moved out of the furrows by the shovels is packed and pulverized on the sides as the wheels pass over it. In performing this two-fold work of cultivating the soil and pulverizing it not only is the soil more perfectly prepared for seeding but the labor is greatly curtailed. For example, the under clods are crushed while in soft condition and the soil is packed at once before it has time to dry out and become hard. The sides of the ridges and the bottoms of the furrows are jointly compressed by the V-shaped form of the wheels thereby leaving well formed ridges with smooth sides and a loose center. The surface of the ridge prepared in this manner will fill more or less with fine cracks after a shower of rain and exposure to sunshine and will not be beaten down and baked into a hard crust as would be the case were the spaces between the furrows flat or made into hard pressed ridges. The fine cracks in a comparatively soft ridge serve to ventilate the soil in the ridge and cause it to dry out in a mellow condition. The ridges act as good conductors of heat and will be penetrated to full depth by the sun rays; this condition of the soil will remain until it is seeded. More particularly describing the soil after it has been acted upon by the shovels and pulverizer wheels reference is made to Figs. 8 and 9 of the drawings. As it appears in Fig. 8 the shovels passing through the soil from the furrows *a* and ridges *b* in ordinary soil where a single gang of shovels meet the requirement. The furrows and ridges made by the shovels would approximately appear as there shown, the top flat lines of the ridges representing the surface line of the field before the shovels have formed the furrows. It is to be understood of course that the surface of the furrows might not be as smooth as there shown under all conditions of soil but it would be approximately so. *c* represents loose soil that has been thrown up on the flat spaces between the furrows forming the ridges by the shovels, and the bottom of the furrows would likewise contain more or less loose soil *d*, depending more or less on the character of the soil. Fig. 8 represents a fair approximation of the appearance of the ground after the shovels have passed therethrough. After the pulverizer wheels pass through and make contact with the bottom and sides of the furrows, those parts will be rendered more sharp and smooth and the tops of the ridges will be rendered slightly rounded more or less as at *c'*. Fig. 9, thus producing a sharp clean furrow which is well compressed on the sides and bottom but not pressed down too hard on the top. The result is that the ridges are not so compact as to become crust covered and to thus shut off absorbtion and ventilation, and moreover the soil is more uniformly prepared and is in an ideal condition for seeding. The machine does not depend upon its weight for penetration of the shovels or pulverizer wheels therefore there is uniformity in the furrows and ridges. The shovels enter the soil and prepare the furrows and ridges for the wheels. The resilient supporting arms 11 of the shovels are curved in the direction of the wheels. With soil that is well packed or ground that is hard two gangs or shovels may be arranged in front of the wheels on rock shafts 12 and 13 which are provided with end bearings 14 and inner bearings 15, the inner bearings being attached to the underside of the draft-pole 16. The front or foremost gang of shovels are arranged from eight to ten inches ahead of the rear gang so that the first gang will split the centers of the second gang of shovels. The points of the shovels of the rear gang travel in alignment with the peripheral centers of the wheels. The front gang of shovels operate between the shovels of the rear gang, therefore all the soil will be moved. For example, assuming that the machine was being operated in well packed or hard ground, the single gang of shovels would make a series of furrows and spaces, the soil in the spaces being not cultivated. The front or additional gang of shovels being set midway between the shovels of the rear gang will open up a series of furrows and ridges, the ridges being directly in front of the shovels of the rear gang. The shovels of the rear gang will split the ridges made by those of the front gang thereby filling up the furrows made by the front gang of shovels and will also pile up a ridge of loose soil between the shovels of the rear gang substantially as if only one gang of shovels were used. By this means it will be seen that the base of the ridge formed by the shovels of the rear gang and the wheels will have been inverted and cultivated. In other words the entire surface of the soil will be acted upon by the shovels and thoroughly cultivated and the ridges will be formed throughout of well tilled soil. Both gangs of shovels are elevated and let down through the operation of a lever 17 to which the rock shafts are connected by links 18, 19, 20 and 21. Figs. 5 and 7 illustrate a modification in the structure of the pulverizer wheels. In this form the central rib 22 is a separate piece and occupies the same position as rib 9 and is of the same depth throughout the circumference of the wheel. It is made from a steel bar rolled to provide the proper penetrating edge. A series of notches 23 is cut in the inner edge of said bar as shown the blank, Fig. 7. These notches enable the bar to be bent in circular form without buckling and when thus bent the outer edges of the notches will close up and will be concealed by being embodied in the hub of the casting a greater extent than the depth of the notches. The notches 23 will fill with the melted iron forming a bond between the steel ring and the face of the wheel as shown in Fig. 5.

Having described my invention I claim:

1. In a machine of the character described, a series of pulverizer wheels mounted for rotation about a common axis and having their adjacent sides arranged in close proximity one to the other, each of said wheels having inclined peripheral walls converging radially, and having a rib projecting from the outer edges of said inclined walls and provided with a continuous circumferential cutting edge, the sides of said rib being arranged at angles to the respective inclined peripheral walls of said wheel, a gang of shovels mounted in advance of said wheels, each of said shovels being arranged in line with the space between two of said wheels, a second gang of shovels arranged between the first gang of shovels and said wheels, and each shovel of said second gang being arranged in line with the cutting edge of one of said wheels, so that the shovels of said second gang will open furrows for the respective wheels between the furrows opened by the shovels of the first gang.

2. In a machine of the character described, a series of pulverizer wheels mounted for rotation about a common axis and having their adjacent sides arranged in close proximity one to the other, each of said wheels having inclined peripheral walls converging radially, and having a rib projecting from the outer edges of said inclined walls and provided with a continuous circumferential cutting edge, the sides of said rib being arranged at angles to the respective inclined peripheral walls of said wheel, a gang of shovels in advance of said wheels and so arranged relatively thereto that said wheels will follow in the furrows opened by the respective shovels and the inclined peripheral walls of said wheels will pack the soil at the sides of said furrows, the circumferential rib will crush the clods and loosen the soil at the bottom of said furrows, and the inclined walls of adjacent wheels will form uniform crowns on the ridges between adjacent furrows, and means arranged in advance of said gang of shovels to loosen the soil between the furrows to be opened by said shovels.

3. In a machine of the character described, a series of pulverizer wheels mounted for rotation about a common axis and having their adjacent sides arranged in close proximity one to the other, each of said wheels having inclined peripheral walls converging outwardly, a gang of narrow shovels arranged in advance of and in line with the respective wheels so that said wheels will follow in the furrows opened by said shovels, and a second gang of narrow shovels in advance of the first mentioned gang of shovels, the shovels of the second gang being arranged in line with the spaces between the shovels of the first mentioned gang, whereby the whole surface of the soil will be loosened and alternate furrows and ridges formed therein, the ridges being formed throughout of well tilled soil.

4. In a machine of the character described, a gang of furrow opening devices spaced relatively short distances apart, a second gang of furrow opening devices arranged in the rear of the first gang, the devices of said second gang being arranged to form furrows in the spaces between the furrows formed by the devices of the first gang and to form the soil displaced from the last mentioned furrows into ridges between said last mentioned furrows, and a gang of wheels arranged to travel in the respective last mentioned furrows, each of said wheels having outwardly converging peripheral walls arranged to compress the sides of said ridges and to crush the clods in said furrows.

In testimony whereof I affix my signature.

STEPHEN H. GARST.

Witnesses:
JOSEPHINE B. GARST,
BARBARA E. GARST.